(12) United States Patent
Strand

(10) Patent No.: US 6,254,316 B1
(45) Date of Patent: *Jul. 3, 2001

(54) CUTTING TOOL AND CUTTING INSERT

(75) Inventor: Bengt Strand, Fagersta (SE)

(73) Assignee: Seco Tools AB, Fagersta (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,839

(22) Filed: Feb. 8, 1999

(30) Foreign Application Priority Data

Feb. 12, 1998 (SE) .................................................. 9800400

(51) Int. Cl.⁷ ............................... B23C 5/20; B23B 27/22
(52) U.S. Cl. ......................... 407/113; 407/114; 407/116; 407/40; 407/47
(58) Field of Search ............................ 407/113–115, 116, 407/34, 40–42, 51, 47

(56) References Cited

U.S. PATENT DOCUMENTS

| | | | |
|---|---|---|---|
| D. 377,801 | * 2/1997 | Kress et al. ......................... D15/139 |
| 4,556,345 | * 12/1985 | Phillippi ................................. 407/114 |
| 4,616,962 | * 10/1986 | Ushijima ............................... 407/113 |
| 4,954,021 | * 9/1990 | Tsujimura .............................. 407/35 |
| 4,966,500 | 10/1990 | Tsujimura et al. . | |
| 4,971,483 | * 11/1990 | Kress .................................... 407/114 |
| 4,995,767 | * 2/1991 | Segal ...................................... 407/41 |
| 5,074,720 | * 12/1991 | Loqvist ................................. 407/114 |
| 5,147,158 | 9/1992 | Riviere . | |
| 5,611,649 | * 3/1997 | Matthias ............................... 407/118 |
| 5,827,016 | * 10/1998 | Strand ................................... 407/115 |
| 5,876,160 | * 3/1999 | Johnson ................................ 407/113 |
| 5,915,889 | * 8/1999 | Kress .................................... 407/114 |
| 6,079,912 | * 6/2000 | Rohthballer ......................... 407/114 |
| 6,116,824 | * 9/2000 | Strand et al. ........................... 407/40 |

* cited by examiner

*Primary Examiner*—A. L. Wellington
*Assistant Examiner*—Erica D Ergenbright
(74) *Attorney, Agent, or Firm*—Burns, Doane, Swecker & Mathis, LLP

(57) ABSTRACT

A milling cutter comprises a holder and at least two cutting inserts. Each cutting insert has a generally hexagonal or octagonal basic shape and includes at least three major cutting edges. An edge face of each insert is provided with a step defining an exit zone for a fracture. At least one of the cutting inserts is a wiper insert and alternating ones of the cutting edges of the wiper insert are major cutting edges separated by a wiper edge. A first distance of the wiper insert extending between two diametrically opposed wiper edges is larger than a second distance of the wiper insert extending between two diametrically opposed major cutting edges.

12 Claims, 3 Drawing Sheets

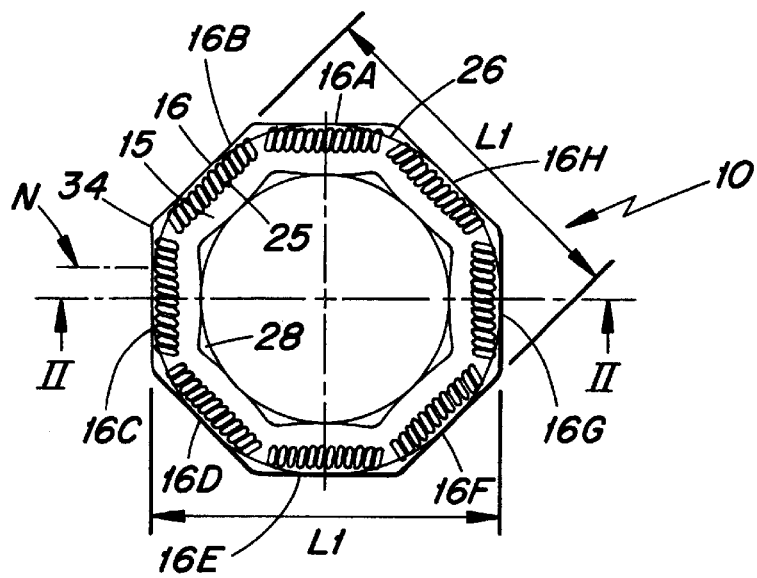
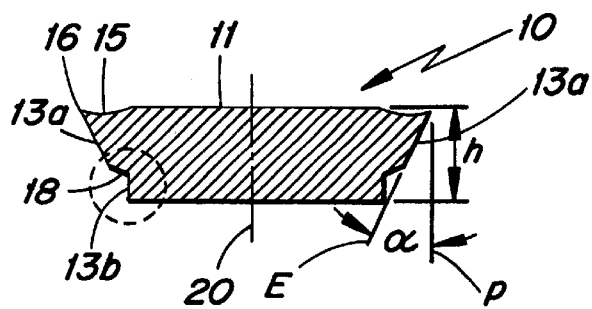
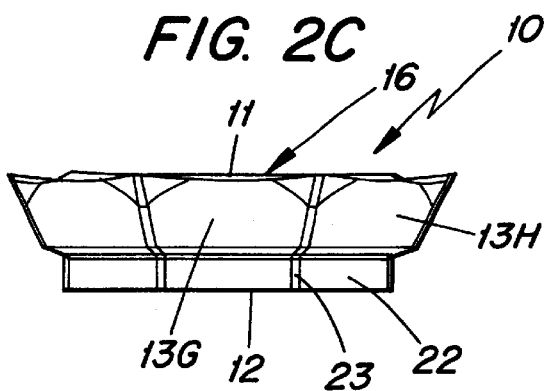
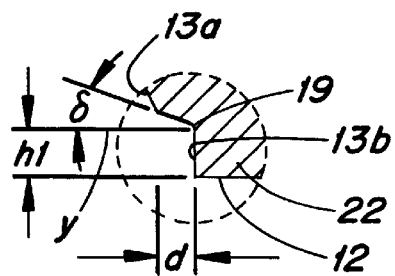
FIG. 2A
FIG. 2B
FIG. 2C
FIG. 2D

CUTTING TOOL AND CUTTING INSERT

FIELD OF THE INVENTION

The present invention relates to a wiper insert and a milling cutter.

BACKGROUND OF THE INVENTION

In tools for metal cutting having indexable cutting inserts of hard and wear resistant material the cutting edges are subjected to wear and sometimes some part of or the entire cutting edge collapses. If a small insert fractures, only the cutting edge collapses without any risk for damage to the tool body. If a large insert fractures, the risk of damage to the tool body increases to an essential degree. If the cutting insert is not seated on a shim then a fracture of the insert often gives rise to damage of the tool body. To avoid such damage it is usual that the cutting insert rests on a shim of cemented carbide. A usual combination is a cutting insert having a thickness of about 5 mm and a shim having a thickness of 3–5 mm. This results in a total thickness of the cutting insert and the shim of 8–10 mm.

Rivière U.S. Pat. No. 5,147,158 shows a four-sided cutting insert having an integrated shim so as to provide a fracture zone. The cutting insert comprises an upper face, a lower face, and an edge clearance face interconnecting said upper and lower faces. The edge clearance face includes a step located intermediate the upper and lower faces. When the insert is in use the step defines a zone with a strain peak such that in the event of insert breakage, the propagation of the crack will be guided to the area of the step. The portion of the insert located below the step remains intact and thus protects the tool body.

Tsujimura et al. U.S. Pat. No. 4,966,500 shows a milling cutter having octagonal or hexagonal cutting inserts. Each cutting insert has a segmented (non-linear) major cutting edge, an end cutting edge and a radially inner cutting edge. The radially inner cutting edge is supposed to cut during coring of the work piece. The known insert lacks fracture zones so as to prevent an insert breakage from transferring into the seat or shim. Furthermore the known milling cutter cannot produce very fine surface finish.

OBJECTS OF THE INVENTION

One object of the present invention is to present a wiper insert and a milling tool that overcome the disadvantages discussed above.

Another object of the present invention is to provide a wiper insert and a milling tool providing a very fine surface finish.

Still another object of the present invention is to provide an economically favorable wiper insert providing at least three wiper edges.

Still another object of the present invention is to provide a wiper insert having a built-in cutting depth.

SUMMARY OF THE INVENTION

These and other objects are realized by a cutting insert comprising an upper face, a lower face, and an edge face. An intersection between the upper face and the edge face forms six or eight cutting edges. The upper face defines a rake face, and the edge face defines a clearance face. The clearance face forms a clearance angle with a plane extending parallel to a center axis of the insert. Alternating ones of the cutting edges define major cutting edges separated by wiper edges. A first distance extending between two diametrically opposite wiper edges is larger than a second distance extending between two diametrically opposed major cutting edges. The first distance is 1% to 5% larger than the second distance.

The invention also relates to a milling cutter wherein at least two of the above described inserts are mounted in a holder.

BRIEF DESCRIPTION OF THE DRAWINGS

The objects and advantages of the invention will become apparent from the following detailed description of a preferred embodiment thereof in connection with the accompanying drawings, and in which:

FIG. 2A shows a plan view of a cutting insert of the milling cutter of FIG. 1;

FIG. 2B shows a section along line II—II in FIG. 2A;

FIG. 2C shows an insert in a side view;

FIG. 2D shows a magnified portion of a lower corner of the insert in FIG. 2B;

DETAILED DESCRIPTION OF A PREFERRED EMBODIMENT OF THE INVENTION

Figure 1A:
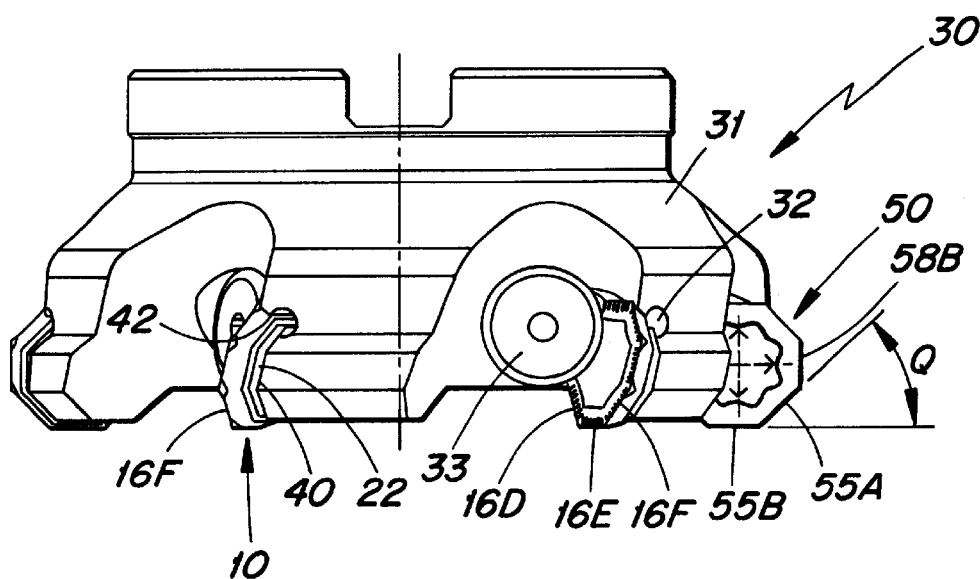
FIG. 1A shows an embodiment of a milling cutter according to the present invention, in a side view.
Figure 1B:
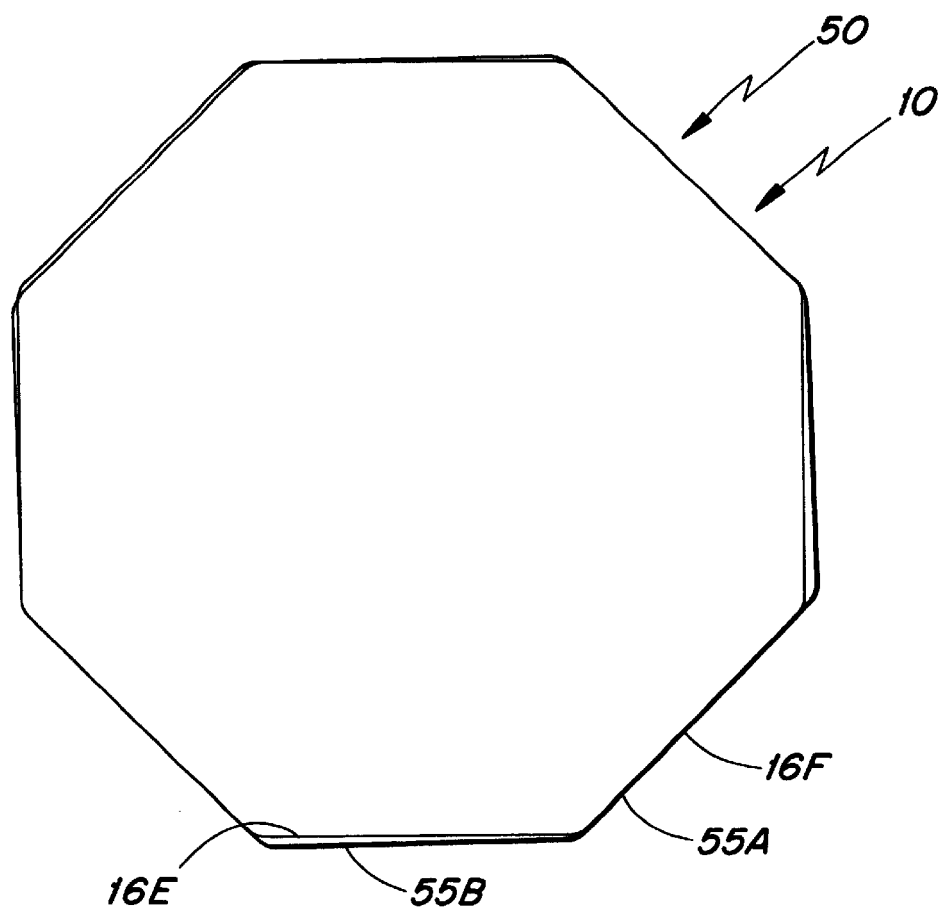
FIG. 1B schematically shows two octagonal cutting inserts in sequence.
Figure 3A:
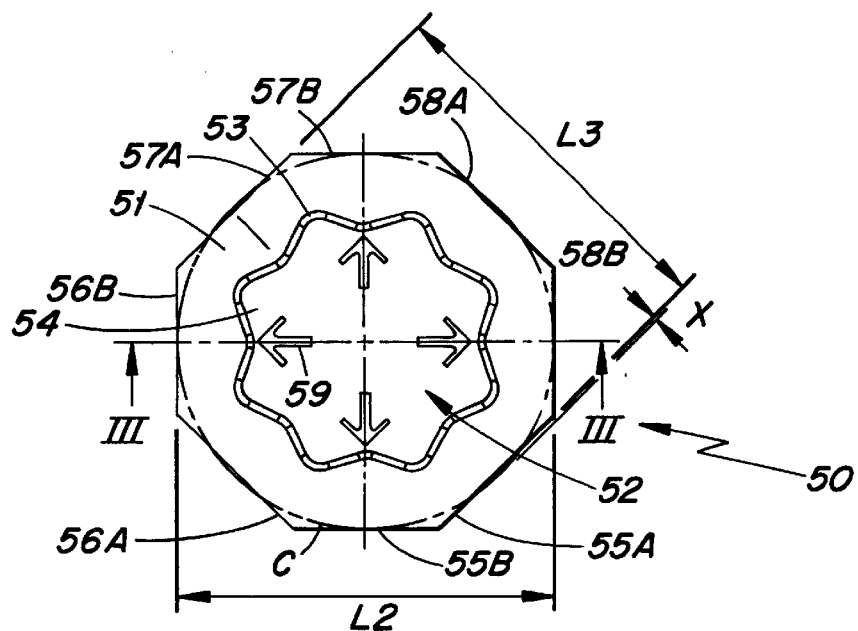
FIG. 3A shows a plan view of a wiper insert according to the present invention.
Figure 3B:
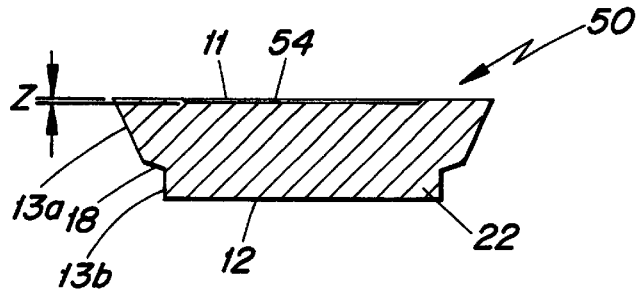
FIG. 3B shows a section along line III—III in FIG. 3A.
Figure 3C:
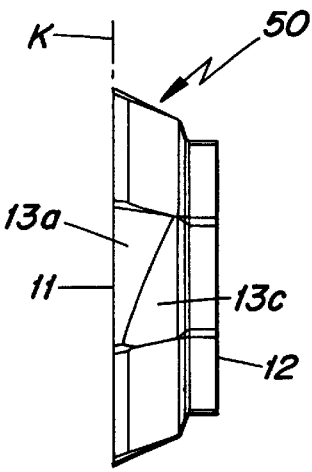
FIG. 3C shows the wiper insert in a side view.
Figure 3D:
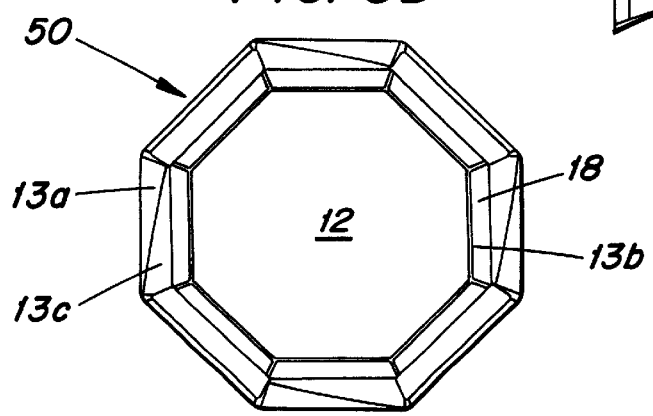
FIG. 3D shows the wiper insert in a bottom view.

In FIG. 1A is shown a milling cutter 30 according to the present invention, including a tool holder 31 and cutting inserts 10 and 50. The holder 30 is a milling cutter body which has a number of pockets 32 for receiving cutting inserts. Each pocket comprises a substantially planar base 40 and two shoulders (only one shoulder 42 being visible). The shoulders are substantially perpendicular to each other. Each shoulder includes a first surface, provided to abut a corresponding first portion 13a of the insert 10 or 50. A threaded boring is provided in the vicinity of the pocket 32 so as to receive a fastening screw 33 to force the insert towards the shoulders and the base, via a radially outer part of the screw head. When the insert is to be indexed, the screw 33 is partially unscrewed until the cutting insert can be pulled by hand radially outwardly and the insert may be rotated by an increment corresponding to 45° counter-clockwise, so that a fresh secondary cutting edge 16E comes into position. Then the insert is pushed into the pocket and the screw is tightened again. The edge 16D is preferably passive and does not cut during milling. To provide for an excellent surface finish, at least one wiper insert 50 according to the present invention is inserted into the milling cutter 30. The wiper insert 50 fits into any of the pockets 32 as described above in connection with the insert 10. The inserts 10, 50 will be located in the holder at a setting angle Q of about 43°, to obtain a clearance angle of about 2° for the secondary cutting edge 16E of the insert 10 and about 0° for the wiper insert edge 55B. FIG. 1B schematically shows two octagonal cutting 10, 50 inserts in sequence, i.e. each insert profile is taken at the same position at the periphery of the cutter.

The cutting insert 10 depicted in FIGS. 2A to 2D has a generally octagonal basic shape and includes an upper face 11, a lower face 12 and an edge face 13 generally interconnecting the upper and lower faces 11 and 12. The cutting insert 10 has a positive geometry, i.e., an upper portion 13a of the edge face defines a clearance face and forms an acute angle with the upper face 11, the latter being a rake face. The upper face 11 includes a chip upsetting face located at the periphery of the insert 10. The upper face 11 furthermore, includes a chip face 15 sloping inwardly and downwardly from the chip upsetting face. The latter faces constitute the most peripheral part of the upper face 11. The intersecting line between the chip upsetting face and the edge face 13 forms the overall cutting edge structure 16, which is defined by eight cutting edges 16A–16H. The chip face 15 is concavely curved and extends inwardly from the chip upsetting face and forms a transition edge 26 therewith. A plurality of projections or preferably depressions 25 are formed in the chip face 15, the projections or depressions 25 being spaced apart along the transition edge 26. The depressions 25 preferably intersect the transition edge and extend inwardly therefrom in a direction non-perpendicularly to the associated cutting edge 16 as said insert is viewed in plan. Each depression thereby forms, as viewed in plan, an angle in the range of 15° to 40° relative to a normal N of the associated cutting edge. The effect of such design is to minimize heat transfer from the chip to the insert.

Respective pairs of adjacent cutting edges 16 meet to form a cutting corner 34 having an internal obtuse angle, about 135°. Each cutting edge is concavely curved when seen in a side view, such that the midsection of the edge is closer to the lower side 12 than are the end sections thereof. A ridge 28 provided at each intersection of the chip faces 15 strengthens each corner 34 and forms the chip generated at the corner 34.

The edge face 13 includes eight segments. An upper portion 13a of each segment of the edge face 13 forms a clearance angle a with a plane P oriented parallel to a center axis 20 of the insert (FIG. 2B). The clearance angle a is at least 20°, preferably at least 25°. The distance between two diametrically opposed major cutting edges 16C and 16G for example is depicted by numeral L1 in FIG. 2A. The distance L1 is the same for all combinations of diametrically opposed major cutting edges.

The eight, planar edge surfaces 13 taper (converge) towards the lower face 12 and generally intersect at the center line 20 of the cutting insert 10 below the lower face 12.

Each segment of the edge face 13 is provided with an inward, downwardly facing shoulder forming a step 18. The upper or first portion 13a of the segment is located above the step 18 and has a positive geometry in order to provide the necessary clearance angle. A lower or second portion 13b of the segment forms a peripheral edge of the shim 22 which is of integral one-piece construction with the upper part of the insert. The shim 22 forms the lower face 12 of the insert. Each second portion 13b extends parallel to a respective one of the cutting edges. The second portion 13b of each segment has a negative geometry, i.e. the second portion 13b is perpendicular to the lower face 12 and thus forms no clearance angle. Each second portion 13b lies radially inside of an imaginary extension E of the associated first portion. That is, the second portion 13b of the edge surface does not need to be ground if the clearance face 13a is ground, thereby saving energy. Furthermore the step 18 will then be sufficiently large in the radial direction to provide for a favorable control of any cracks emanating during machining. The step 18 thus provides a sharp inner corner 19 that constitutes an exit zone for a fracture that by a possible break of the cutting edge controls the break and leaves the lower portion of the cutting insert undamaged. By the term "sharp" is here meant that the corner is intentionally weakened by having a radius of 0 to 0.3 mm, preferably about 0.2 mm. The second or lower portion 13b thus protects the tool body.

Directing attention to FIG. 2B and 2D the following is to be said. The height $h_1$ of the second portion 13b is 15–60% of the insert height h, preferably about 25%. This is possible since the anvil or shim constitutes an integral part of the cutting insert 10, i.e. the height $h_1$ corresponds to the height of the integrated shim 22. In order to achieve a good function of the cutting insert 10 it is necessary that the height $h_1$ does not constitute too big a part of the height h since in that case the strength of the cutting edge would be too low. That could result in fractures of the cutting edge also at small loads. The smallest radial distance d from the step 18 to the second portion 13b in the plane of the lower face 12 depends on the clearance angle. The distance in the cross section II—II in FIG. 2A, is in the interval 0.01–1.0 mm, preferably 0.1 mm.

The second portion 13b is about parallel with the center axis 20. The step 18 forms an angle δ with a line y extending perpendicular to the center axis 20. The angle δ is 0° to 30°, and preferably about 20°.

Eight second portions 13b are formed around the periphery of the shim 22. Two adjacent ones of the second portions 13b meet in a corner 23 at an internal obtuse angle, about 135°. The corners project radially relative to the rest of the second portions 13b. The periphery of the lower part describes a path of increasing and decreasing radial distances from the center axis 20 of the insert.

Turning now to FIGS. 3A to 3D a wiper insert 50 according to the present invention is shown having the same basic shape as the insert 10 described above and like features are depicted by like numerals hereinafter. The cutting insert 50 depicted in FIGS. 3A to 3D has a generally octagonal basic shape and includes an upper face 11, a lower face 12 and an edge face 13 generally interconnecting the upper and lower faces 11 and 12, respectively. The cutting insert 50 has a positive geometry, i.e., an upper portion 13a of the edge face defines a clearance face and forms an acute angle with the upper face 11, the latter being a rake face. The upper face 11 includes a circumferential land 51 located generally at the periphery of the insert 50 (see FIG. 3A). The upper face 11 furthermore includes a recess 52 defined by a star-shaped rim 53 sloping inwardly and downwardly from the land 51 to a bottom surface 54. The rim 53 describes a path of a generally sinusoidal curve. The rim is provided to safeguard the insert from being thrown outwardly if the frictional force between the fastening device and the bottom 54 is overpowered by centrifugal force. The depth Z of the recess 52 is about 0.1 mm. The bottom surface 54 is provided with four markings or arrows 59 to facilitate identification of respective wiper edges 55B–58B. That is, the intersecting line between the land 51 and the edge face 13 forms four pairs of cutting edges 55–58, each pair comprising a major cutting edge 55A–58A and a wiper edge 55B–58B such that every other cutting edge is a major cutting edge 55A–58A joining a wiper edge 55B–58B situated between two major cutting edges. A first distance L2 between two diametrically opposed, parallel, wiper edges 56B and 58B for example, is larger than a second perpendicular distance L3 between two diametrically opposed, main cutting edges 55A and 57A. The first distance L2 is about 1% to 5% larger than the second distance L3, preferably about 1.5% larger. The first distance L2 is about 0.1% to 1% larger than the distance L1 of the insert 10, preferably about 0.5% larger. The edges 55B–58B are substantially straight when seen in a side view and lie in a common plane K (FIG. 3C) but are preferably somewhat curved when seen in a plan view. The radius of said curve is about 600 mm. An imaginary circle C inscribed in the insert 50 touches each wiper edge, i.e. each wiper edge is tangential to the circle. A part of each major cutting edge extends radially inside of the circle C by a distance X, FIG. 3A. Locating segments 13c connected to the upper portions 13a are provided at a clearance angle which is larger than the clearance angle of the upper portions 13a.

The insert 50 is mounted to the tool body in generally the same manner as the insert 10. However, only two of the passive locating segments 13c connected to the wiper edges, for example 56B and 57B, will simultaneously bear against the shoulders of the tool body 31. By the term "passive" is here meant that the segment or connected cutting edge is not in cutting position. In the position shown in FIG. 1B the major cutting edge 55A of the wiper insert 50 is aligned with the major cutting edge 16F of the insert 10, i.e. they coincide with an imaginary truncated cone. By having the active wiper edge 55B of the wiper insert extend further forwardly in the axial direction of the milling cutter as compared to the edge 16E of the insert 10, due to the longer distance L2, the edge 55B will generate the surface in the workpiece (not shown). Furthermore by having the distance L3 of the wiper insert shorter than the distance L1 of the insert 10, the edges 55A and 16F still can lie in a common imaginary cone.

The recess 52 is provided to cooperate with the screw head 33 to keep the insert 50 from being thrown radially outwardly from the cutter due to centrifugal forces when in use.

By applying the teachings of the present invention, there are provided a wiper insert and a milling tool providing a very fine surface finish. Furthermore an economically favorable wiper insert having at least three wiper edges is provided. In addition, the wiper insert is easily mounted in the tool body since the wiper insert has a built-in cutting depth. By providing the cutting insert 10, 50 with an integral shim, defined by a sharp corner, the possible cracks will be stopped from propagating into the holder body. The present invention provides an economical solution to the user, by having eight cutting edges in combination with wiper edges and by saving holder bodies if the insert fractures. In addition, the tool according to the present invention cuts in an easy manner through the workpiece metal which is especially important when a thin flange is supposed to remain connected to the work- piece of aluminum, for example.

Although the present invention has been described in connection with a preferred embodiment thereof, it will be appreciated by those skilled in the art that additions, deletions, modifications, and substitutions not specifically described may be made without departing from the scope of the invention as defined in the appended claims. For instance, the inserts 10, 50 may alternatively have hexagonal basic shapes and thus the insert 10 would provide six cutting edges and the wiper insert 50 would provide three wiper edges. Furthermore, in the disclosed embodiment the cutting inserts 10, 50 are completely solid but may alternatively be provided with a through-hole intended to receive clamping screws that secure the cutting inserts to the tool holder.

What is claimed is:

1. A cutting insert comprising an upper face, a lower face, and an edge face; an intersection between the upper face and the edge face forming an even number of from six to eight cutting edges; the upper face defining a rake face; the edge face defining a clearance face and forming a clearance angle with a plane extending parallel to a center axis of the insert; the cutting edges including major cutting edges and wiper edges, each wiper edge disposed between two successive major cutting edges; each major cutting edge being disposed opposite, and parallel to, another of the major cutting edges; each wiper edge disposed opposite, and parallel to, another of the wiper edges; a first perpendicular distance extending between each pair of diametrically opposite wiper edges being 1% to 5% larger than a second perpendicular distance extending between each pair of diametrically opposed major cutting edges.

2. The cutting insert according to claim 1, wherein the edge face is provided with a step defining an exit zone for a fracture.

3. The cutting insert according to claim 2 wherein a distance extending from a center line of the cutting insert to the periphery of the cutting insert perpendicular to the center axis is smaller below the step than above the step, a distance from the lower face to the step being 15–60% of a distance from the lower face to the cutting edge, the step defining an exit zone for a fracture radially inside the clearance face.

4. The cutting insert according to claim 1 wherein a part of each major cutting edge extends radially inside of an imaginary circle which is inscribed in the insert and to which each wiper edge is tangentially arranged.

5. The cutting insert according to claim 1 wherein the upper face includes a land located generally at the periphery of the cutting insert, the upper face including a recess defined by a star-shaped rim sloping inwardly and downwardly from the land to a bottom surface, a depth of the recess being about 0.1 mm, an intersecting line between the land and the edge face forming four pairs of cutting edges, each pair comprising one of the major cutting edges and one of the wiper edges.

6. A milling cutter comprising a holder and at least two cutting inserts, the holder defining an axis of rotation and including an axially forward end, the cutting inserts mounted at the forward end in circumferentially spaced-apart relationship; each insert including an upper face, a lower face, and an edge face; an intersection between the upper face and the edge face forming an even number of from six to eight cutting edges; the upper face defining a rake face; the edge face defining a clearance face and forming a clearance angle with a plane extending parallel to a center axis of the respective insert; one of the inserts defining a main insert, and another of the inserts defining a wiper inset;

wherein each cutting edge of the main insert being disposed opposite and parallel to another of the cutting edges of the main insert and spaced therefrom by a first distance;

the cutting edges of the wiper insert including major cutting edges and wiper edges, each wiper edge disposed between two successive major cutting edges; each wiper edge disposed opposite, and parallel to, another of the wiper edges and spaced therefrom by a second distance; each major cutting edge disposed opposite and parallel to another of the major cutting edges and spaced therefrom by a third distance, the second distance being 1% to 5% larger than the third distance and larger than the first distance; wherein one of the cutting edges of the main insert constitutes an active cutting edge, and one of the wiper edges of the wiper insert extends farther axially forwardly than the active cutting edge.

7. The milling cutter according to claim 6 wherein the edge face is provided with a step defining an exit zone for a fracture.

8. The milling cutter according to claim 6 wherein a part of each major cutting edge extends radially inside of an imaginary circle which is inscribed in the insert and to which each wiper edge is tangentially arranged.

9. The milling cutter according to claim 6 wherein the upper face of each wiper insert includes a land located generally at the periphery of the respective wiper insert, the upper face of each wiper insert including a recess defined by a star-shaped rim sloping inwardly and downwardly from the land to a bottom surface, a depth of the recess being about 0.1 mm, an intersecting line between the land and the edge face forming four pairs of cutting edges, each pair comprising one of the major cutting edges and one of the wiper edges.

10. The milling cutter according to claim 6 wherein a distance extending from a center line of the cutting insert to the periphery of the cutting insert perpendicular to the center axis line is smaller below the step than above the step, a distance from the lower face to the step being 15–60% of a distance from the lower face to the cutting edge, the step defining an exit zone for a fracture radially inside the clearance face.

11. A cutting insert comprising an upper face, a lower face, and an edge face; an intersection between the upper face and the edge face forming an even number of cutting edges, the even number being from six to eight, the upper face defining a rake face; the edge face defining a clearance face and forming a clearance angle with a plane extending parallel to a center axis of the insert; the cutting edges including major cutting edges and wiper edges, each wiper edge disposed between two successive major cutting edges; each major cutting edge being disposed opposite, and parallel to, another of the major cutting edges; each wiper edge disposed diametrically opposite, and parallel to, another of the wiper edges; a first perpendicular distance extending between each pair of diametrically opposite wiper edges being 1% to 5% larger than a second perpendicular distance extending between each pair of diametrically opposed major cutting edges; wherein the upper face includes a land located generally at the periphery of the cutting insert; the upper face including a recess defined by a star-shaped rim sloping inwardly and downwardly from the land to a bottom surface; a depth of the recess being about 0.1 mm.

12. A milling cutter comprising a holder and at least two cutting inserts, each insert including an upper face, a lower face, and an edge face; an intersection between the upper face and the edge face forming four pairs of cutting edges, the upper face defining a rake face; the edge face defining a clearance face and forming a clearance angle with a plane extending parallel to a center axis of the respective insert; the cutting edges of at least one of the cutting inserts including major cutting edges and wiper edges, each wiper edge disposed between two successive major cutting edges; each major cutting edge being disposed opposite, and parallel to, another of the major cutting edges; each wiper edge disposed opposite, and parallel to, another of the wiper edges; a first perpendicular distance extending between two diametrically opposite wiper edges being 1% to 5% larger than a second perpendicular distance between two diametrically opposed major cutting edges; the at least one cutting insert which includes major cutting edges and wiper edges constituting at least one wiper insert; wherein the upper face of each wiper insert includes a land located generally at the periphery thereof; the upper face of each wiper insert including a recess defined by a star-shaped rim sloping inwardly and downwardly from the land to a bottom surface; a depth of the recess being about 0.1 mm; an intersecting line between the land and the edge face of each wiper insert forming the four pairs of cutting edges, each pair comprising a major cutting edge and a wiper edge.

\* \* \* \* \*